2,792,306
VACUUMIZING TO IMPROVE COLOR OF SAUSAGE

Robert H. Harper, Park Forest, Ill., assignor to Swift & Company, Chicago, Ill., a corporation of Illinois No Drawing. Application July 7, 1955, Serial No. 520,628

5 Claims. (Cl. 99—109)

This invention relates to an improved method for processing cured sausage items to obtain a product with an improved color and a color of greater stability.

It is known that hemoglobin and myoglobin, the principal pigments of a newly slaughtered animal, combine physically with molecular oxygen of the air to give the fresh meat pigments of oxyhemoglobin and oxymyoglobin. These latter two pigments in the presence of a curing salt, such as sodium nitrite, are converted to methemoglobin and metmyoglobin, undesirable brown pigments, which must be reduced to hemoglobin and myoglobin in order for the curing reaction to proceed. It is generally postulated that hemoglobin and myoglobin combined with nitric oxide liberated by the curing salts to form the cured meat pigments of nitric oxide hemoglobin and nitric oxide myoglobin. Thus, it is seen that the removal of the air from a sausage emulsion is desirable in that the curing reaction will proceed faster, there being less oxyhemoglobin and oxymyoglobin present, and further for the reason that any unreacted oxygen remaining in the product at the end of processing will effectively decrease the stability of the cured meat pigments. Another advantage with the removal of air is that there will be less drain upon the natural reducing agents of the meat to reduce the meat pigments, since less of such pigments are formed, thus leaving a greater reservoir of the natural reducing agents for the protection of the cured meat color.

The meat packing industry has recognized that it is desirable to remove as much of the air as possible from the sausage emulsion, and to this end, it was thought at one time that the vacuum mixing of the emulsion would expedite removal of the air. This practice proved objectionable for it developed that on not infrequent occasions, the agitation of the emulsion under the vacuum would break the emulsion of meat and water. As a result of this difficulty, many installations abandoned the vacuum mixer and turned to the use of a vacuum chamber employing no agitation for the removal of the air. While it is true that the use of the vacuum chamber does facilitate the elimination of some of the air from the emulsion, the practice is not wholly satisfactory for much of the air remains entrapped.

I have discovered that vacuum mixing may be utilized with proper precautions to effectively exhaust the entrapped air, giving a product of an improved initial color and a color of much greater stability, without danger to the stability of the emulsion as heretofore experienced. The product resulting from my process has a higher density than that formerly manufactured and it has been observed that the texture is surprisingly improved. The improved texture is a decided advantage in that the vacuum packaging of slices of such products in a film presents a more attractive surface.

An object of this invention is to provide an improved process for the manufacture of cured sausage items to obtain an improved color and a color of greater stability.

Another object is to provide a method for the processing of sausage items to improve texture.

Another object is to provide a method for effectively exhausting air from the sausage emulsion without breaking the emulsion of meat and water.

These and other objects will be apparent to one skilled in the art from the following detailed description.

Broadly speaking, I contemplate in my improved process initially drawing a substantial vacuum upon the meat and water emulsion while holding the emulsion in a quiescent state and then agitating the emulsion under vacuum to assist in release of the air for an interval of time inadequate to endanger the stability of the emulsion.

It has been my observation that if the mixing be carried on from beginning of the buildup of the vacuum that the prolonged working of the meat emulsion will frequently result in a breakdown of the emulsion. This is the difficulty widely experienced in the use of the vacuum mixer and which caused many installations to turn to the vacuum chamber without agitation. In my method of operation, the meat emulsion is initially held in a quiescent state while a substantial vacuum is being built up. As has been observed in the use of the vacuum chamber, the emulsion under the effect of the vacuum will swell considerably, perhaps a third of its original volume. The vacuum chamber does remove a considerable amount of the air, but as evidenced by the swelling of the emulsion, much of the air remains entrapped. The release of the vacuum in the chamber collapses the swollen emulsion upon itself entrapping the air which is responsible for the swelling. Now, in the practice of my method, after the drawing of the substantial vacuum on the emulsion, the emulsion is agitated under vacuum to assist in the release of the air. In a preferred embodiment of the invention, the agitation under the vacuum is carried on for an interval of approximately one minute. It is my experience that this brief agitation is adequate to release the entrapped air provided a substantially full vacuum is pulled prior to mixing. When vacuum mixers were initially investigated by the manufacturers of sausage items, it was general practice to mix throughout the vacuuming cycle of at least five minutes and more commonly for 10 to 15 minutes. It now appears that this prolonged mechanical working of the emulsion contributed to the frequent breakdown of the emulsion.

In my preferred practice of the method of the invention, the initial vacuum drawn is within the range of 20–28 inches Hg, the top limit of the vacuum of course being dependent upon the efficiency of the system. With a vacuum of the order of 26 inches Hg, the emulsion need not be agitated in excess of approximately one minute in order to release the air from the system. Agitation for this preferred interval has never resulted in breakdown of the emulsion. As a matter of fact, somewhat longer periods of agitation could probably be used but any increase in time increases the likelihood of emulsion breakdown and since effective removal can be accomplished with approximately one minute agitation, there is no compelling reason why longer periods should be employed. Preferably, subsequent to the one minute agitation, the emulsion is held for a further interval of at least one minute under vacuum without agitation to assure substantially complete removal of the air bubbles broken under agitation.

It has been my experience that the vacuumizing of the emulsion without agitation to a vacuum in excess of at least 24 inches Hg followed by agitation under vacuum for approximately one minute and then a subsequent vacuumization of at least another minute is especially effective.

The density of the meat emulsion is inversely proportional to the amount of air entrapped. It can be readily demonstrated that my method is much preferred to the use of the vacuum chamber which employs no agitation. From actual experience, I have found that 20 minutes in a vacuum chamber at 28 inches Hg will result in emulsion having a density of 1.01, whereas the same emulsion processed in accordance with the method of the invention had a density of 1.04. In the utilization of my method, the emulsion was first held without agitation for 3 minutes to build up a vacuum of 25 inches and then subsequently agitated for one minute. The amount of air remaining in the vacuum chamber processed emulsion is approximately 30% of that originally present and in the instance of my process, roughly 7%.

*Example I*

Prior to this experiment, it was thought that the stability of the cured color was directly related to the density of the product. This experiment was undertaken primarily to learn whether it was possible to obtain a satisfactorily high density through treatment in a vacuum chamber and to confirm the significance of density. In processing with the aid of a vacuum chamber, the emulsion is placed in a tank truck generally to a depth of approximately 15 inches and the truck moved into the chamber, the door closed and the vacuumization commenced. As previously mentioned, there is no agitation of the meat mass. In the instant experiment, both the depth of the meat mass and the time of vacuumization were varied. In sample 1, the meat was placed in the tank truck to a depth of 3½ inches and the mass vacuumized for 5 minutes at 28 inches Hg. The second sample had the same depth but was vacuumized for 20 minutes at the same degree of vacuum. A third sample placed at the same depth was vacuumized for 10 minutes again with the same vacuum. A fourth sample which covered the bottom of the tank truck to the depth of 7 inches was vacuumized for 5 minutes and a fifth sample was processed for 20 minutes at the same depth as the fourth sample. Both of the latter samples were subjected to vacuums of roughly 26 inches.

A sixth sample of the same emulsion was subjected to a 3–1–1 cycle in a vacuum mixer. In the latter sample, the emulsion was transferred to the vacuum mixer and the vacuum drawn for 3 minutes without agitation to a vacuum of 25 inches Hg. The vacuum was held for another minute during which time the meat mass was agitated. Following this latter interval, agitation was ceased and the vacuum held for another minute before opening of the mixer.

The several samples were stuffed and smoked in the conventional manner. The several products were sliced and observed on the fourth day following the processing to evaluate color stability. The product treated in the vacuum mixer was decidedly the best, with no appreciable difference being seen among the several samples processed in the vacuum chamber. Densities were taken both before the meat was smoked and following smoking. The vacuum mixer product had a density of 1.04 prior to smoking and 1.03 subsequent thereto. In the instance of the other samples, all were on the order of 1.01 before smoking and each evidenced a slight decrease in density after smoking.

*Example II*

In the work of this example, portions of the same bologna emulsion were used for the vacuum mixed product and the control which was treated in the conventional manner, i. e., vacuumized in a vacuum chamber (without agitation). The control was subjected to a vacuum of 24 inches. The test lot was transferred to a vacuum mixer where the vacuumizing cycle was 3 minutes static, one minute active, followed by one minute static. Again, the vacuum was on the order of 24 inches Hg. The products of the emulsion out of the vacuum mixer and vacuum chamber were stuffed and given a conventional smoking. The densities of the final products were found to be 1.05 for the vacuum mixer and 0.97 for the control product. Slices were taken from each of the two lots, packaged and exposed for 3 days to 50 foot candles of light in a conventional display case. At the end of this period, the vacuum mixed product had a far superior color to the control which had faded considerably.

*Example III*

The work of this example shows that vacuum mixing in accordance with my process will improve the color of the product made with high colored paprika as well as a paprika product containing ascorbic acid. Six samples were prepared. Samples 1 and 2 were conventional bologna emulsions. Samples 3 and 4, the same emulsion with added paprika and samples 5 and 6, the same emulsion with added paprika plus ascorbic acid in an amount of approximately 0.3 of an ounce per 100 lbs. of meat. Samples 1, 3, and 5 were vacuumized in a chamber and the other samples processed in a vacuum mixer wherein the vacuum cycle was 3 minutes static, one minute active and one minute static, following which the six lots of product were stuffed and smoked in the conventional manner. A vacuum of approximately 25½ inches Hg was used in both the chamber and the mixer. The product was sliced and packaged and held for a period of time. It was noted throughout the observation period that the vacuum mixed product in each instance was brighter in color than its respective control.

*Example IV*

In this example, six lots of bologna were made up from the same emulsion. Sample A was treated in a vacuum chamber. Sample B was vacuum mixed in the manner described in the other examples, employing a 3–1–1 cycle. Sample C contained 0.045% ascorbic acid based on the weight of the meat which ascorbic acid was incorporated during the chopping operation. The latter sample was vacuum mixed using the same cycle described. Sample D, containing paprika, was treated in the vacuum chamber as sample A. Sample E also contained paprika and was vacuum mixed as sample B. Sample F, containing paprika and ascorbic acid in the amount of 0.045% based on the weight of the meat, was vacuum mixed. Samples of each of these lots were stuffed and smoked at the same time. After a conventional chilling period, the six lots were sliced and vacuum packaged and subsequently exposed to light in a commercial display case with observations being made at frequent intervals regarding the relative color brightness and stability.

From the beginning to the end of the exposure period, samples B and E were definitely superior in color to samples A and D. Samples C and F were roughly comparable to samples A and D throughout the period. The work of this example shows again that vacuum mixing does improve the color stability. Density were determined and found to be 0.934, 1.06, 0.927, 1.03, and 1.06 respectively for samples A through F. It will be seen that each of vacuum mixed products had a density consistently higher than the products treated in the vacuum chamber.

Obviously, many modifications and variations of the invention as hereinbefore set forth may be made without departing from the spirit and scope thereof, and therefore only such limitations should be imposed as are indicated in the appended claims.

I claim:

1. In a process for preparing a cured sausage item having an improved color, the steps comprising forming an emulsion of meat and water, drawing a substantial vacuum in excess of 20" Hg upon said emulsion while holding the emulsion in a quiescent state, then agitating the emulsion under said vacuum to assist in the release of the air from the emulsion for an interval of time inadequate to break the emulsion and not in excess of five minutes.

2. A process in accordance with claim 1 wherein the agitation under the vacuum is carried on for an interval of time of approximately one minute.

3. In a process for preparing a cured sausage item having an improved color, the steps comprising forming an emulsion of meat and water, drawing a substantial vacuum in excess of 20" Hg upon said emulsion while holding the emulsion in a quiescent state, then agitating the emulsion under said vacuum to assist in the release of the air from the emulsion for an interval of time inadequate to endanger the stability of the emulsion and not in excess of five minutes, and subsequently discontinuing the agitation while holding the vacuum for a further interval of time.

4. A process in accordance with claim 3 wherein the agitation under the vacuum is carried on for an interval of time of approximately one minute.

5. In a process for the manufacture of a cured sausage item having an improved color, the steps comprising preparing a meat and water emulsion, vacuumizing the emulsion without agitation under a vacuum of at least 24" Hg, agitating the emulsion under the vacuum for approximately one minute, and subsequently discontinuing the agitation while holding the vacuum for a further interval of at least one minute.

References Cited in the file of this patent

UNITED STATES PATENTS

| | | |
|---|---|---|
| 2,266,877 | Lindberg et al. | Dec. 23, 1941 |
| 2,681,279 | Sloan | June 15, 1954 |
| 2,690,970 | Moses | Oct. 5, 1954 |